United States Patent
Lewis et al.

(10) Patent No.: US 7,866,730 B2
(45) Date of Patent: Jan. 11, 2011

(54) THERMOFORMED TWINSHEET MOLDED VEHICLE DOOR SYSTEM

(75) Inventors: Stephen J. Lewis, Harrison Township, MI (US); Adolf Enrico Milani, Commerce, MI (US); Randy R. Rhoades, Boonville, IN (US); Christopher S. Klem, St. Meinrad, IN (US); Duane C. Junkin, Madison Heights, MI (US); Keijo J. Huotari, Fenton, MI (US)

(73) Assignee: Magna International Inc., Aurora (CA)

( * ) Notice: Subject to any disclaimer, the term of this patent is extended or adjusted under 35 U.S.C. 154(b) by 100 days.

(21) Appl. No.: 12/291,891

(22) Filed: Nov. 14, 2008

(65) Prior Publication Data

US 2010/0123263 A1     May 20, 2010

(51) Int. Cl.
*B60J 5/04*     (2006.01)

(52) U.S. Cl. ...................... 296/146.5; 49/502; 52/784.1

(58) Field of Classification Search ............. 296/146.1, 296/147, 148, 149, 151, 146.2, 146.3, 146.5, 296/146.6, 146.8, 146.9, 146.11, 146.12, 296/190.11; 49/502; 52/784.1
See application file for complete search history.

(56) References Cited

U.S. PATENT DOCUMENTS

| | | | |
|---|---|---|---|
| 5,000,990 A | * | 3/1991 | Freeman ................... 428/36.1 |
| 7,216,926 B2 | * | 5/2007 | Hampel ................. 296/190.08 |

* cited by examiner

*Primary Examiner*—Joseph D Pape
(74) *Attorney, Agent, or Firm*—Warn Partners, P.C.; Marc Luddy

(57) ABSTRACT

The present invention is a twinsheet door which includes a first door portion and a second door portion connected to the first door portion. The twinsheet door of the present invention is manufactured using a thermoforming process, during which a vacuum shapes the first door portion and the second door portion such that one or more closed sections are created when the first door portion is thermally bonded to the second door portion and simultaneously a vacuum is applied to form the first door portion and said second door portion. The closed section formed between the first door portion and second door portion provides additional strength and rigidity to the twinsheet door. Additionally, the forming of the closed section between the first door portion and the second door portion and the bonding between the first door portion and second door portion is achieved during a single manufacturing process.

35 Claims, 7 Drawing Sheets

THERMOFORMED TWINSHEET MOLDED VEHICLE DOOR SYSTEM

FIELD OF THE INVENTION

The present invention relates to door panels which are thermoformed and bonded together. More specifically, the present invention relates to two panels which are simultaneously thermoformed and bonded together to form the door of a vehicle.

BACKGROUND OF THE INVENTION

The process of thermoforming products is generally known. Thermoforming processes are used for producing various parts such as panels for the interior of a vehicle.

One of the advantages of using a thermoforming process is that it provides a relatively efficient and inexpensive way to manufacture various components for a vehicle. Using a thermoforming process to manufacture panels used for the interior of a vehicle, or exterior panels which can form the body of the vehicle help to reduce costs during the manufacturing process. Typically, these panels are made from a single sheet of material conducive to a thermoforming process. One of the drawbacks in using a thermoforming process to form a panel of a vehicle using a single sheet is that often times the finished part does not have the required structural rigidity or strength to meet the desired specifications of the manufacturer. As a result, additional secondary structure is needed to provide support for the panel, resulting in increased time and cost in manufacturing, as well as increased material cost to provide the necessary structure for the part.

Accordingly there exists a need for a method for manufacturing a thermoformed part which also includes the structural strength required by various manufacturers.

SUMMARY OF THE INVENTION

The present invention is a twinsheet door which includes a first door portion and a second door portion connected to the first door portion. The twinsheet door of the present invention is manufactured using a thermoforming process, during which a vacuum shapes the first door portion and the second door portion such that one or more closed sections are created when the first door portion is thermally bonded to the second door portion and simultaneously a vacuum is applied to form the first door portion and said second door portion. The closed section formed between the first door portion and second door portion provides additional strength and rigidity to the twinsheet door. Additionally, the forming of the closed section between the first door portion and the second door portion and the bonding between the first door portion and second door portion is achieved during a single manufacturing process.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
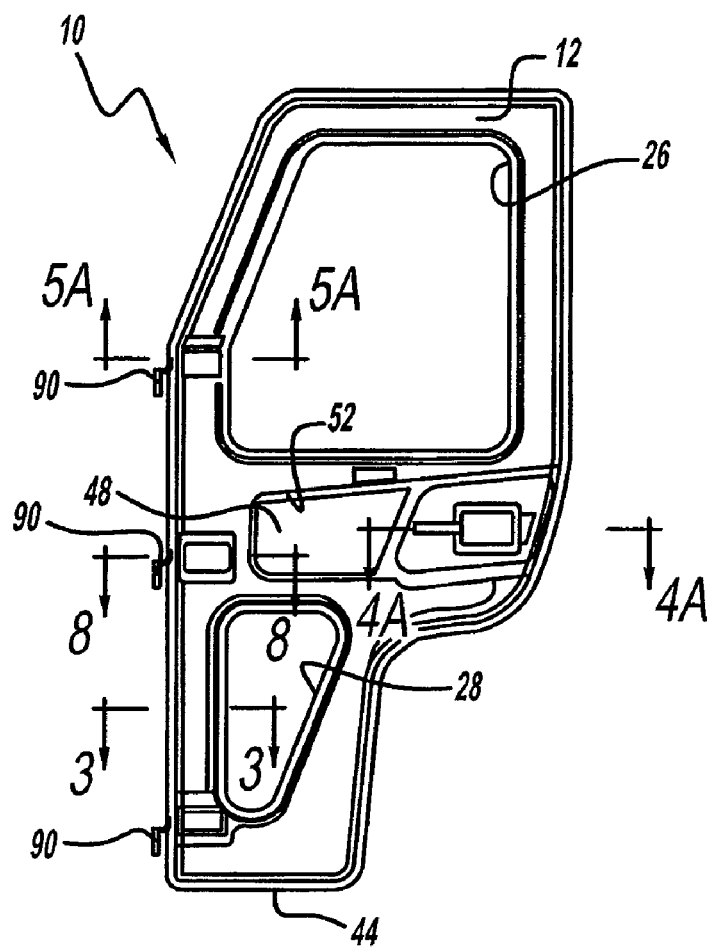
FIG. 1A is a side view of a twinsheet door manufactured using a thermoforming process, according to the present invention.
Figure 1B:
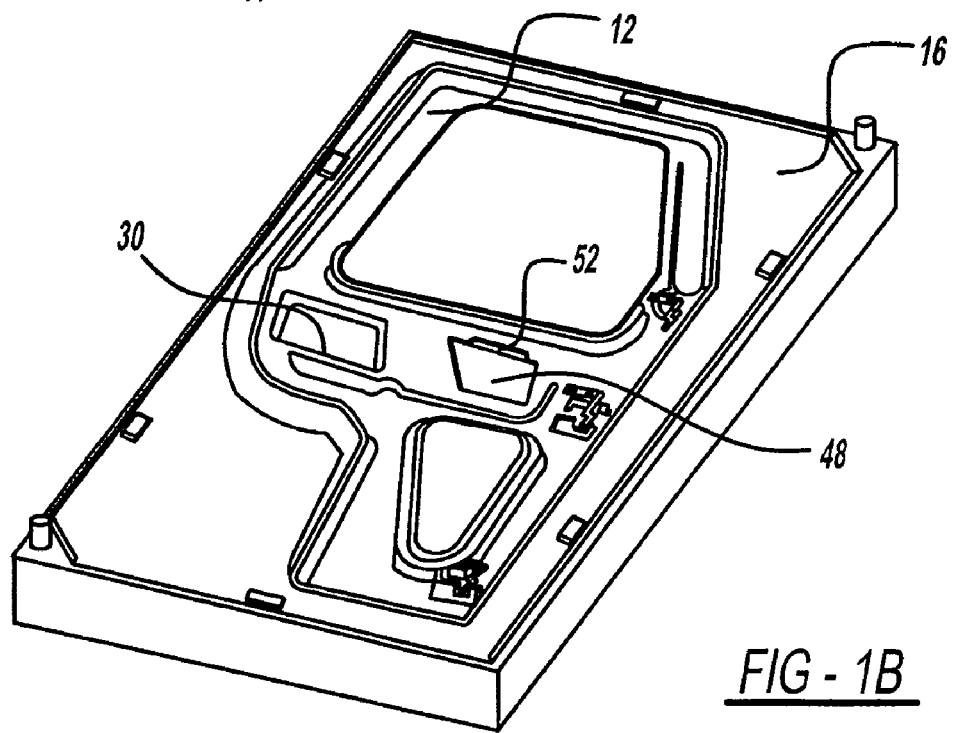
FIG. 1B is a perspective view of a first portion of a twinsheet door located in a mold, manufactured according to a thermoforming process, according to the present invention.
Figure 2A:
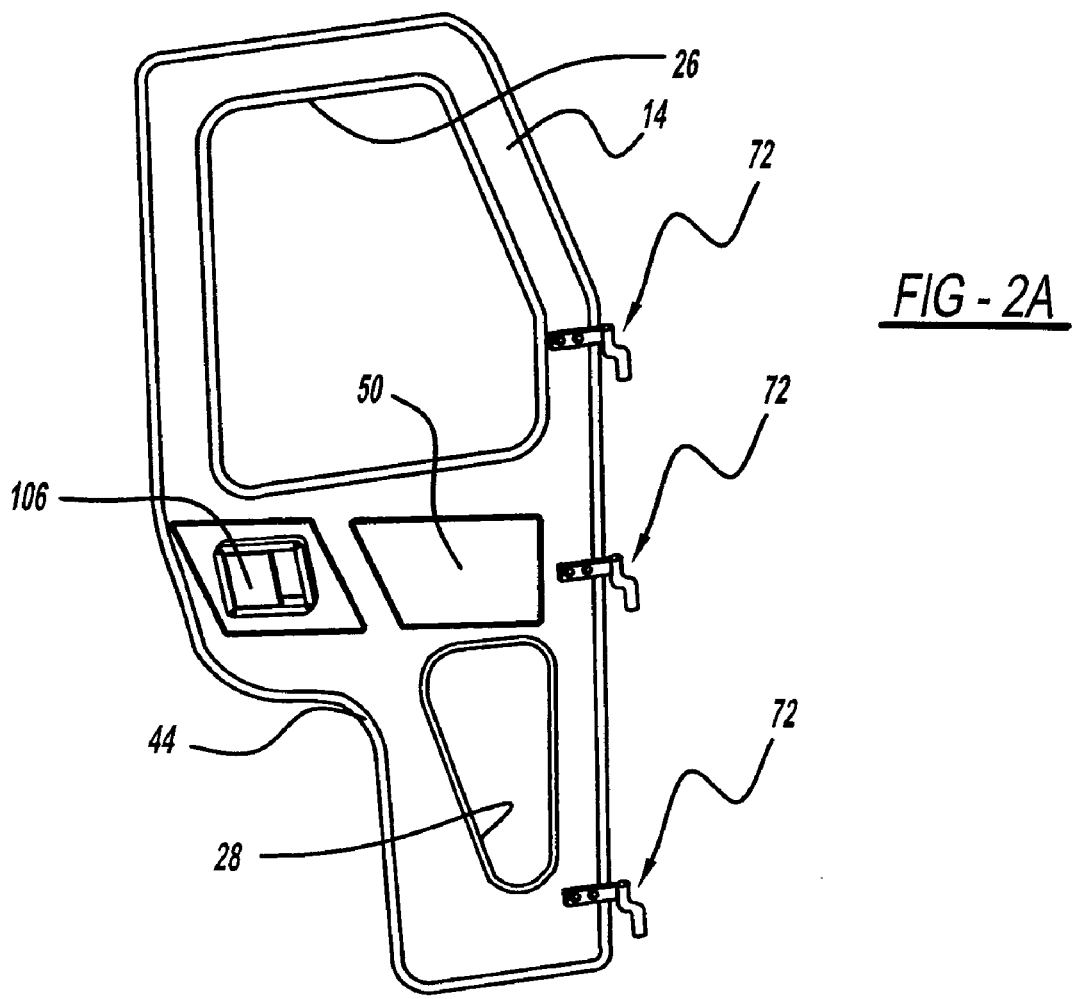
FIG. 2A is a second side view of a twinsheet door, manufactured according to a thermoforming process, according to the present invention.
Figure 2B:
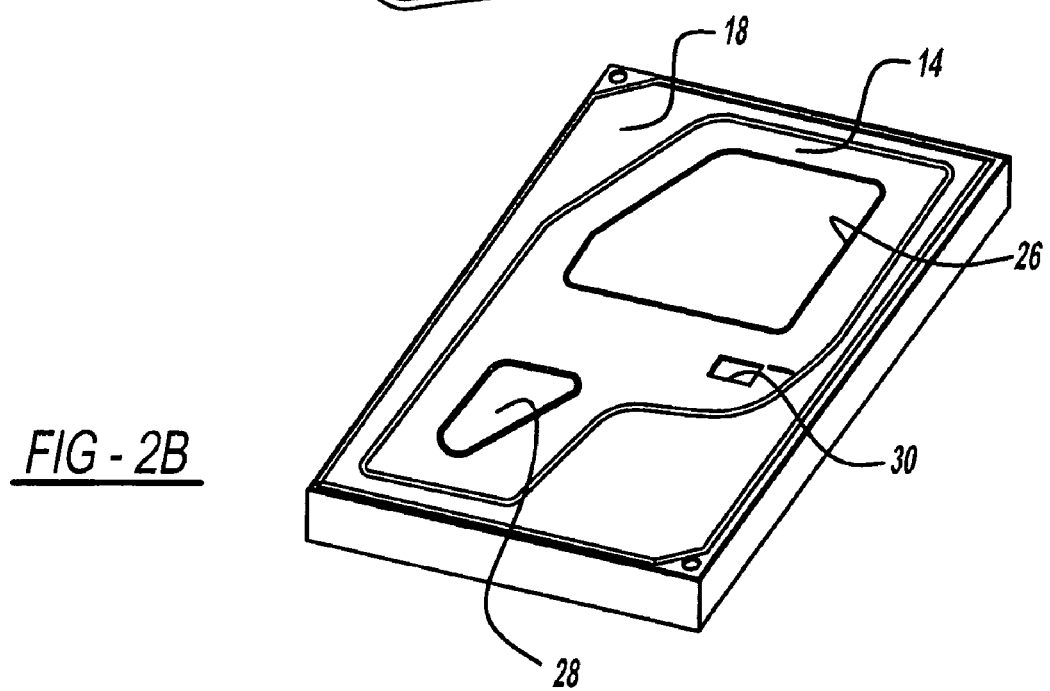
FIG. 2B is a perspective view of a second portion of a twinsheet door located in a mold, manufactured according to a thermoforming process, according to the present invention.

A door made according to the thermoforming process of the present invention is shown generally in FIG. 1A at 10. Referring to the Figures generally, the door 10 includes a first door portion or inner skin 12 and a second door portion or outer skin 14. In accordance with the method aspects of the present invention, both the inner skin 12 and outer skin 14 are made from what is called "sheet stock." Sheet stock is a plastic sheet which in this embodiment is made of Thermo-Plastic Polyolefin (TPO) that is cut into blanks, which in this embodiment would be used for the skins 12,14. In this embodiment, the sheet stock will have a thickness of substantially 4.5 mm, but it is within the scope of the invention that other thicknesses may be used. In accordance with another method aspect of the present invention the blanks are heated and then inserted into a mold, in this embodiment there is an inner mold 16 and an outer mold 18. The inner mold 16 is used for producing the shape of the inner skin 12, and the outer mold 18 is used for producing the shape of the outer skin 14.

During the thermoforming process used to make the door 10 of the present invention, each sheet is heated, and one sheet is placed into the inner mold 16, and another sheet is placed into the outer mold 18. Both the mold 16,18 are connected to a vacu-former type of device (not shown) which produces a vacuum to draw the sheet stock of the inner skin 12 and outer skin 14, respectively, away from each other into the proper shape to produce the inner skin 12 and outer skin 14. However, during the vacu-form process, the molds 14 and 18 are also pressed together, and a melt-bond 20 is formed between a first outwardly extending flange or first outer flange 22 formed on the inner skin 12 and a secondly outwardly extending flange, or second outer flange 24 formed on the outer skin 14 during the forming process. There are also several inner flanges formed on both the inner skin 12 and outer skin 14 which form apertures that are used for placing windows and a door latch on the door 10. After the thermoforming process, portions of the sheet stock are cut and the door 10 is then trimmed to form the apertures. The inner skin 12 and outer skin 14 have a final target thickness of substantially 3.8 mm, but it is within the scope of the invention that other thicknesses may be used, depending up on the application. This is part of a routing operation applied to the door 10. In this embodiment, there is a first aperture 26 cut out of the door 10, as well as a second aperture 28 and a third aperture 30 cut out of the door 10.

Surrounding the first aperture 26, there is a first inner flange 32 which is melt-bonded to a second inner flange 34 during the thermoforming process to form another melt-bond 20. Similarly, surrounding the second aperture 28 there is a third inner flange 36 which becomes melt-bonded to a fourth inner flange 38 during the thermoforming process to produce yet another melt-bond 20. Once the door 10 is formed and the skins 12,14 are bonded together, windows, generally shown at 54 are attached to the door 10. The windows 54 have a frame portion 56 and a window pane 58. The frame portion 56 is attached to the door 10 through the use of any type of suitable fastener, such as a bolt, rivet, or the like. In this embodiment, there are a series of bolts 60 which are screwed through the frame portion 56 and the flanges 32,34 in the first aperture 26, and through the frame portion 56 and the flanges 36,38 of the second aperture 28. The windows 54 may be of the type that can be opened and closed, as shown in the first aperture 26, or the windows 54 may be of the type that do not open and close, as shown in the second aperture 28.

The first flange 22 formed on the inner skin 12 and the second flange 24 formed on the outer skin 14 extend around the periphery of the inner skin 12 and outer skin 14, respectively. Once they are melt-bonded together, a weatherstrip 44 is placed on the molded flanges 22,24 for preventing moisture and other debris from entering the vehicle in which the door 10 is used. The weatherstrip 44 includes a gap 46 which receives the flanges 22,24 after they are molded together.

There is also a portion of the inner skin 12 and outer skin 14 which forms a first wall portion 48 and a second wall portion 50. The first wall portion 48 includes a rib 52 which is melt-bonded to the second wall portion 50. The rib 52 provides additional support and structure for the door 10.

Figure 3:
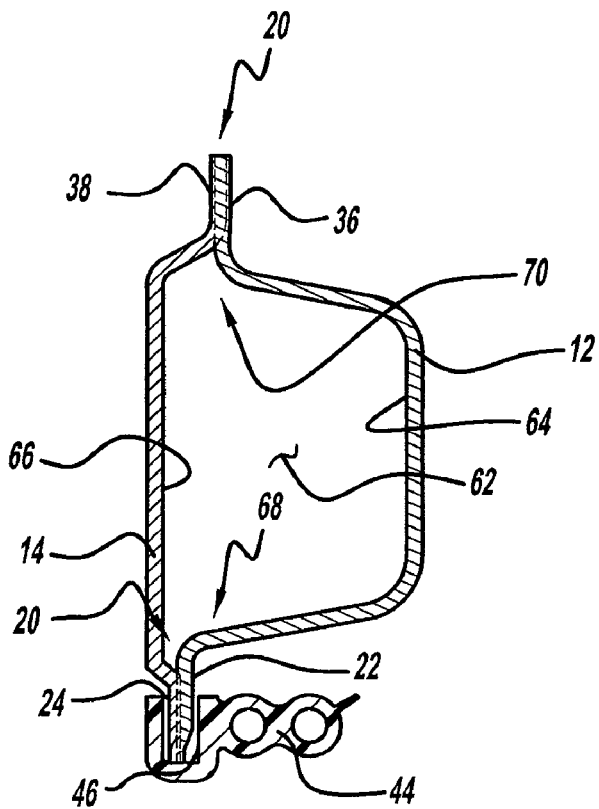
FIG. 3 is a sectional view taken along lines 3-3 of FIG. 1A.
Figure 5A:
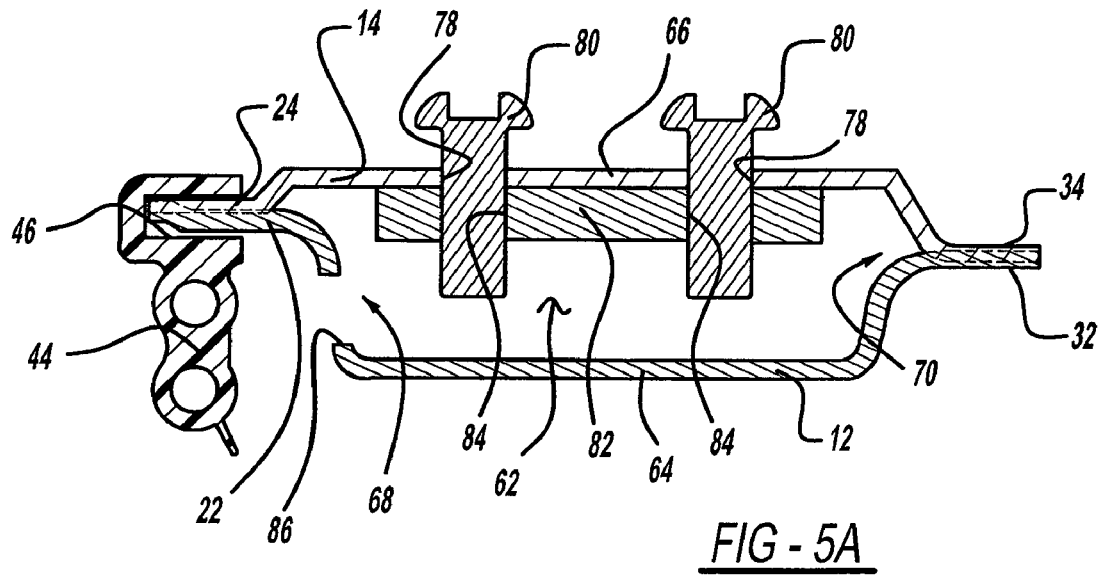
FIG. 5A is a sectional view taken along lines 5A-5A of FIG. 1A.

A cross-section of part of the door 10 can be seen in FIG. 3. As mentioned above, the skins 12,14 are vacuum formed to form the portions of the door 10. The vacuuming of the skins 12,14 also creates a void or closed section 62. The void 62 is created when the skins 12,14 (when in the form of sheet blanks) are placed into the respective molds 16,18, and the vacuum force is applied, drawing a portion of the skins 12,14 away from each other, while simultaneously melt-bonding the flanges 22,24 together, creating the void or closed section 62. The closed section 62 has a first side 64 formed by a portion of the inner skin 12, and a second side 66 formed by a portion of the outer skin 14. The first side 64 and second side 66 are drawn away from each other during the vacuum process, and remain substantially parallel to each other during and after the vacuum and thermoforming processes. There is also a third side, generally shown at 68, formed by portions of both skins 12,14, and a fourth side, generally shown at 70 which is also formed by portions of both skins 12,14. The third side 68 and the fourth side 70 are also shaped during the vacuum process, examples of which are shown in FIGS. 3 and 5A. The shape of the four sides 64,66,68,70 forming the closed section 62 improves the structural rigidity of the door 10. The shape of the four sides 64,66,68,70, and hence the cross-section of the door 10, also varies in different areas of the door 10.

In FIG. 3, the third side 68 is the part of the inner skin 12 that extends in continuous fashion from the first side 64 to the first outer flange 22, and the part of the outer skin 14 that extends in continuous fashion from the second side 66 to the second outer flange 24. The fourth side 70 in FIG. 3 is the part of the inner skin 12 that extends in continuous fashion from the first side 64 to the third inner flange 36, and the part of the outer skin 14 that extends in continuous fashion from the second side 66 to the fourth inner flange 38.

Figure 5B:
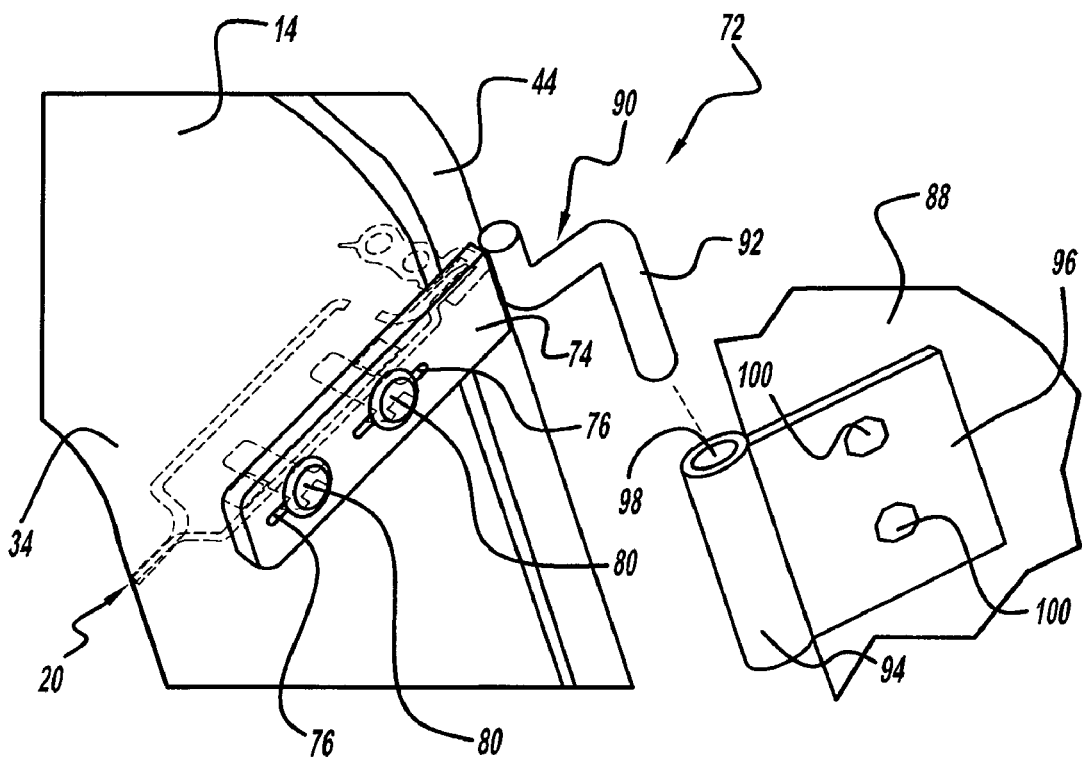
FIG. 5B is an enlarged perspective view of a hinge used for a twinsheet door, according to the present invention.
Figure 6:
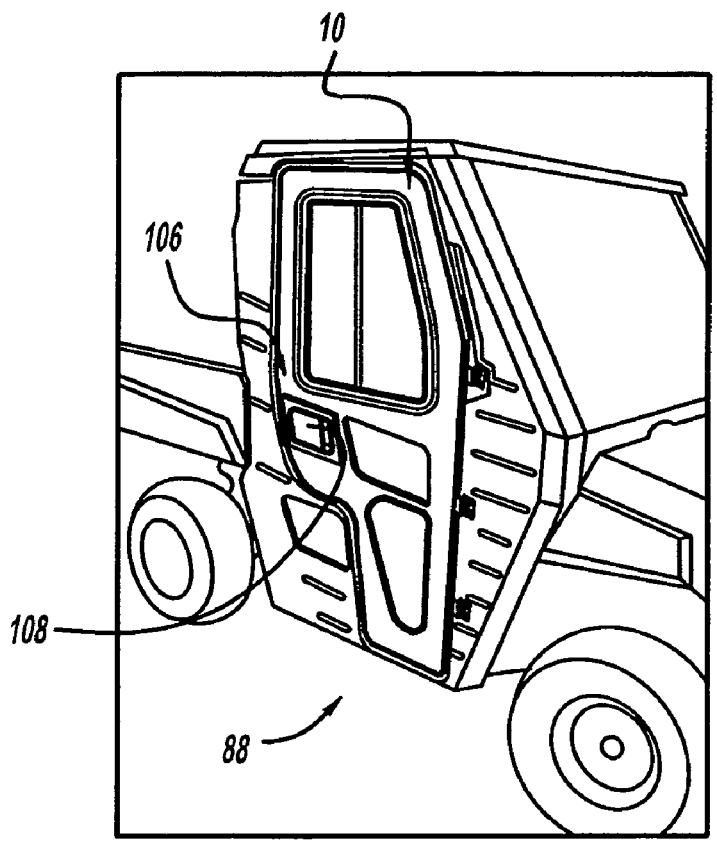
FIG. 6 is a perspective view of a twinsheet door attached to a vehicle, according to the present invention.
Figure 7:
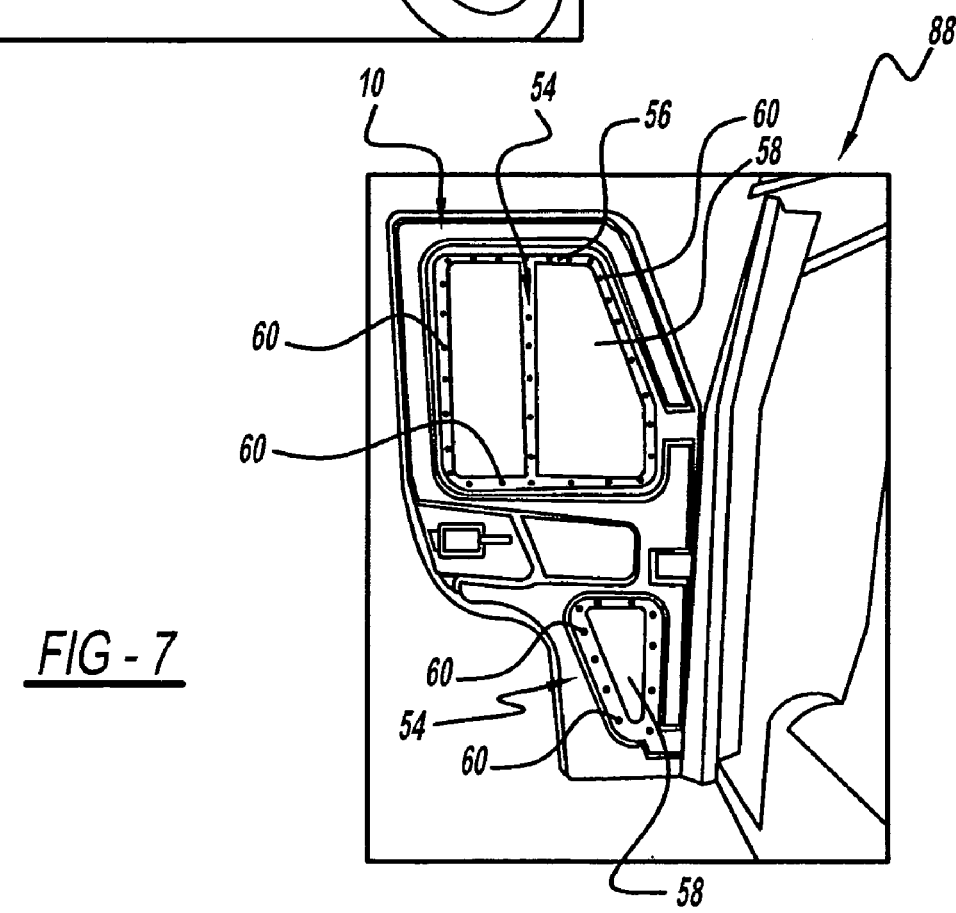
FIG. 7 is partial a side view of a twinsheet door attached to a vehicle, according to the present invention.
Figure 8:
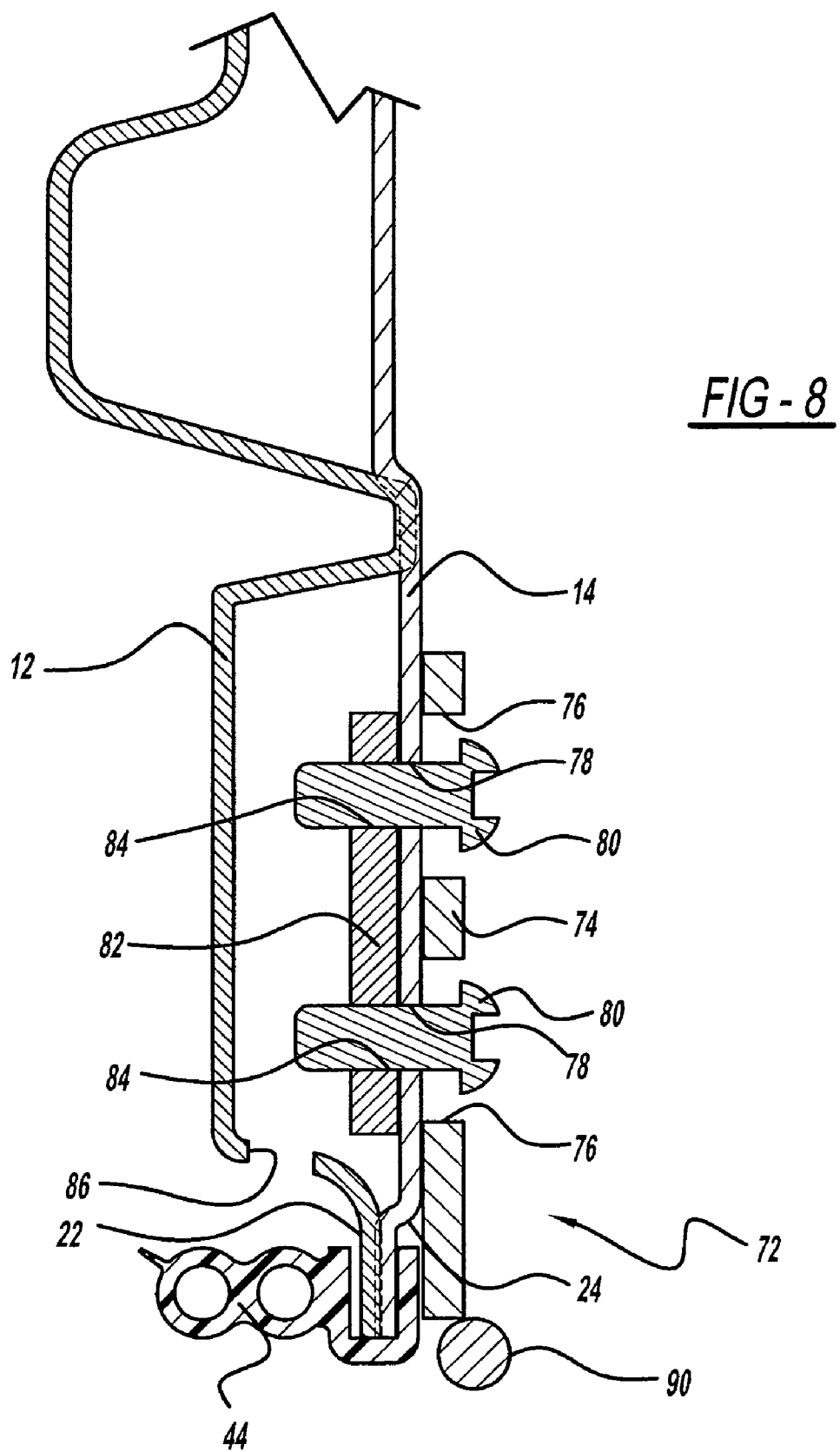
FIG. 8 is a sectional side view taken along lines 8-8 of FIG. 1A.

Referring more specifically to FIGS. 5A,5B and 8, there are also several exterior hinges, shown generally at 72, which are used to allow the door 10 to pivot relative to a vehicle, shown generally at 88 in FIGS. 6 and 7. Each hinge 72 includes a base plate 74 having a pair of slots 76. In similar fashion to FIG. 3, the part of the door 10 shown in FIG. 5A also has a closed section 62. However, the first and second sides 64,66 are closer together, and the shape of the third and fourth sides 68,70 are different because the shape of the door 10 in the area of the cross-section shown in FIG. 5A is different.

There is also a pair of apertures 78 cut into the outer skin 14, and a pair of bolts 80, which extend through the slots 76 and the apertures 78 as shown in FIGS. 5B and 8. There is also a tapping plate 82 which has a pair of corresponding threaded apertures 84 which also receive a portion of the bolts 80. The skins 12,14 are thermoformed and melt-bonded together as described above, and the third side 68 is similar to the third side 68 shown in FIG. 3, with the exception that the shape is different, and there is a trimmed slot 86 is cut into the inner skin 12 so the tapping plate 82 can be inserted into a location between the skins 12,14 as shown in FIGS. 5A and 8. In FIG. 5A, the fourth side 70 is formed by a part of the inner skin 12 extending in continuous fashion from the first side 64 into the first inner flange 32, and a part of the outer skin 14 extending in continuous fashion from the second side 66 into the second inner flange 34.

Once the tapping plate 82 has been inserted, the bolts 80 are inserted through the slots 76, apertures 78, and into the corresponding threaded apertures 84. When first assembled, the bolts 80 are not tightened completely, but rather, they are left loose so that the position of the base plate 74 can be adjusted to allow the door 10 to be positioned relative to the vehicle 88 properly.

Each hinge 72 also includes a pin 90 which is attached to the base plate 74. In this embodiment, the pin 90 is shaped as shown in FIGS. 1A, 2A, 5B, and 6-8 so as to have a portion 92 which is able to be received into a cylinder 94, with the cylinder 94 being attached to a plate 96. To assemble, the portion 92 of the pin 90 is simply inserted into an aperture 98 formed on the cylinder 94. The plate 96 is attached to the vehicle 88 through the use of typical fasteners 100. In this embodiment, there are three hinges 72, and the assembly process described is the same for all three hinges 72. Having the portion 92 of the pins 90 simply inserted into the respective cylinders 94 allows for simple attachment and detachment of the door 10 to the vehicle 88.

Figure 4A:
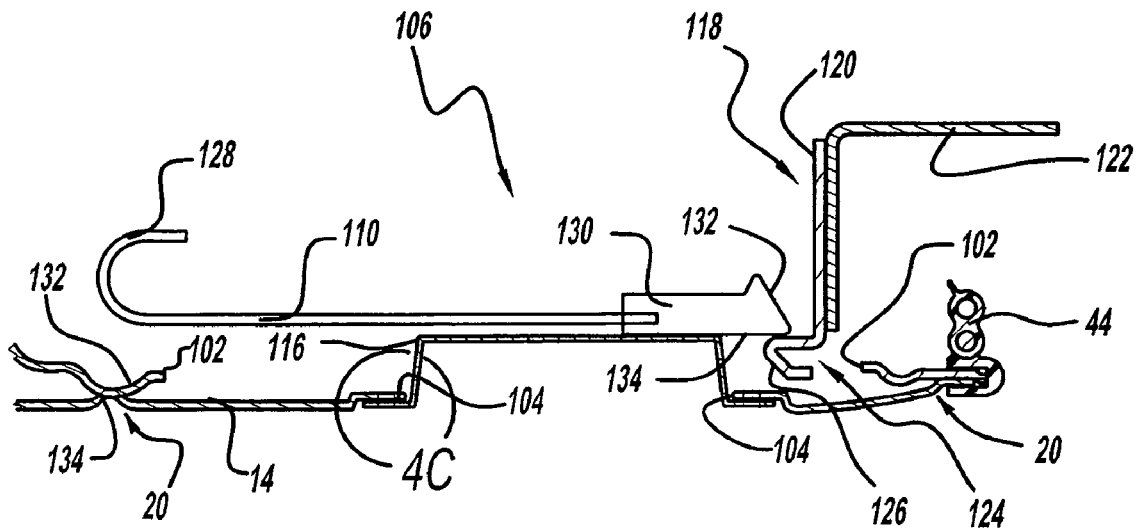
FIG. 4A is a sectional view taken along lines 4A-4A of FIG. 2A.
Figure 4B:
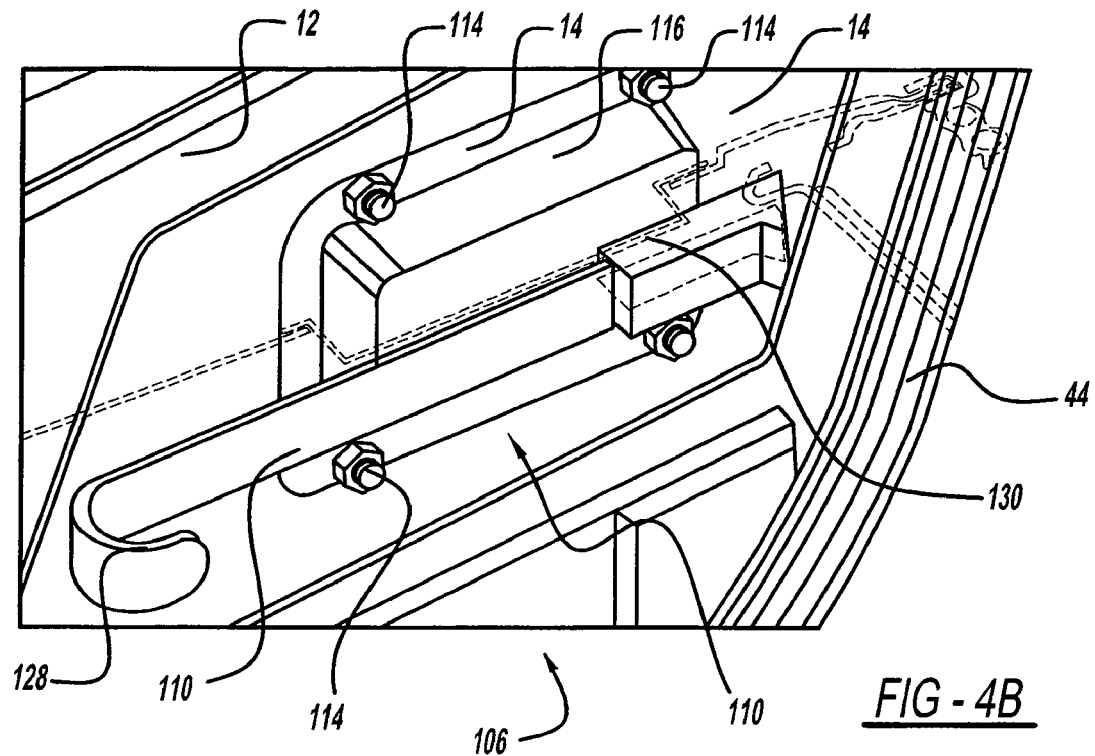
FIG. 4B is an enlarged perspective view of a door latch connected to a twinsheet door, according to the present invention.
Figure 4C:
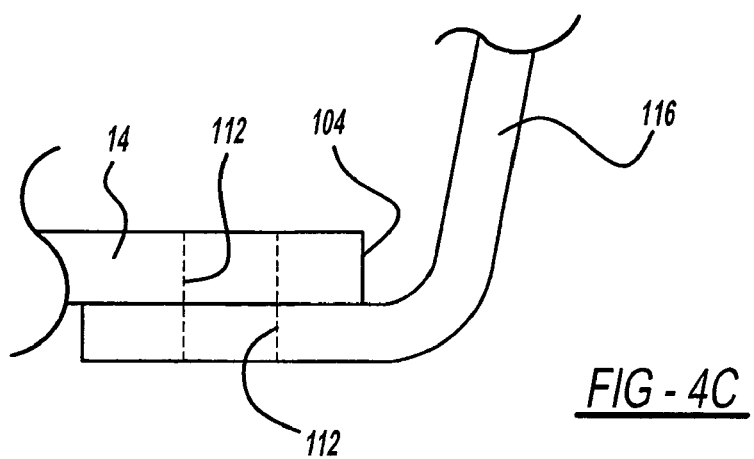
FIG. 4C is an enlarged view of a circled portion of FIG. 4A.

As mentioned above, there is also a third aperture 30 formed in the door 10. However, to form the third aperture 30, the portion cut out of the inner skin 12 is of a different size compared to the portion cut out of the outer skin 14. The third aperture 30 therefore consists of a large cut-out portion 102 taken from the inner skin 12 and a small cut-out portion 104 taken from the outer skin 14. The reason for this is to accommodate a door latch, generally shown at 106. The aperture 30 in both the inner skin 12 and outer skin 14 allows the door latch 106 to be exposed to both the inside and outside of the vehicle 88 when in a closed position, enabling the door 10 to be opened and closed from the inside or outside of the vehicle 88. The door latch 106 is a typical latch that may be used on different types of vehicles. The door latch 106 includes a paddle flap 108 which is exposed to the outside of the vehicle 88, and also a door handle 110 which is exposed to the inside of the vehicle 88. There are several apertures 112 which are cut into the outer skin 14 as shown in FIG. 4C which allows the door latch 106 to be attached to the outer skin 14 through the use of fasteners 114. The door latch 106 includes a housing 116 which is the portion of the door latch 106 that the fasteners 114 attach to the outer skin 14.

The door latch 106 functions with a catch mechanism, generally shown at 118. The catch mechanism 118 includes a flange portion 120 which is bolted to a roll cage 122. While a portion of the roll cage 122 is shown in FIG. 4A, the roll cage 122 forms part of the frame of the vehicle 88. The catch mechanism 118 also includes a lipped portion, generally shown at 124, having an angled surface 126. The door handle 110 also includes a rounded portion 128 and a locking mechanism 130. The locking mechanism 130 includes an angled surface 132 and a locking surface 134. The door 10 is shown in a closed position in FIGS. 4A and 6. When in the closed position, the locking surface 134 is in contact with the lipped portion 124 of the catch mechanism 118, and prevents the door 10 from being opened. When it is desired to open the door 10 from the inside of the vehicle 88, the handle 110 is moved to the right when looking at FIG. 4A such that the locking surface 134 is no longer in contact with lipped portion 124. This will allow the door 10 to be opened, as shown in FIG. 7.

To close the door 10 from an open position, the door 10 is simply pivoted about the hinges 72 such that the door latch 106 pivots towards the vehicle 88. As the door 10 shuts, the angled surface 132 of the locking mechanism 134 will come in contact with and slide along the angled surface 126 of the lipped portion 124, causing the door handle 110 to move to the right when looking at FIG. 4A, allowing the locking mechanism 130 to move around the lipped portion 124 of the catch mechanism 118 to the position shown in FIG. 4A. The door handle 110 is attached to several mechanical components in the housing 116 which allow the handle 110 to slide along the outside of the housing 116 and work in conjunction with the paddle flap 108. The components linking the paddle flap 108 and the handle 110 have been removed for purposes of clarity, and are not necessary for describing the invention.

As mentioned above, the paddle flap 108 is connected mechanically to the door handle 110. To enter the vehicle 88 when the door 10 is closed, the paddle flap 108 is simply pulled such that the paddle flap 108 pivots, and the mechanical components inside the housing 116 will cause the door handle 110 to move to the left (when looking at FIG. 4A) such that the locking surface 134 is no longer in contact with lipped portion 124, and the door 10 will then be able to be opened, as described above.

It can also be seen in FIG. 4A that there is a first rib 132 formed in the inner skin 12 near the edge of the large cut-out 102, and a second rib 134 formed in the outer skin 14 in proximity to the first rib 132. During the thermoforming process, the first rib 132 is formed into the inner skin 12, and the second rib 134 is formed in the outer skin 14 while simultaneously being melt-bonded together. The melt-bond between the ribs 132,134 provides an additional connection between the inner skin 12 and outer skin 14, in addition to the melt-bond between the outer flanges 22,24, the inner flanges 32,34 surrounding the first aperture 26, the inner flanges 36,38 surrounding the second aperture 28, and the rib 52 melt-bonded to the second wall portion 50.

It is also within the scope of the invention that the shape of the molds 16,18 may be changed to such that other melt-bonds are produced between the inner skin 12 and outer skin 14. Once the door 10 is formed and assembled, the shape of the skins 12,14 provides the required structural rigidity to meet various production requirements, while at the same time accomplishing the forming of the shape of the skins 12,14 and producing the melt-bonds simultaneously. Producing the shape of the skins 12,14 and the melt-bonds 20 in a single step allows for the production of a cost-effective and efficient way to manufacture the door 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A twinsheet door, comprising:
   a first door portion;
   a second door portion connected to said first door portion;
   one or more closed sections created when said first door portion is thermally bonded to said second door portion and simultaneously a vacuum is applied to form said first door portion and said second door portion, said one or more closed sections providing structure and rigidity to said twinsheet door;
   a first side formed by a portion of said first door portion;
   a second side formed by a portion of said second door portion, said first side and said second side being drawn away from each other when said vacuum is applied to form said first door portion and said second door portion, said first side being on the opposite side of said closed section as said second side;
   a third side formed by a portion of said first door portion and a portion of said second door portion, connecting said first side and said second side;
   a fourth side formed by a portion of said first door portion and a portion of said second door portion, connecting said first side and said second side, said fourth side being on the opposite side of said close section as said third side;
   a first outwardly extending flange formed on said first door portion; and
   a second outwardly extending flange formed on said second door portion, part of said third side of said one or more closed sections being formed by a part of said first door portion extending in continuous fashion from said first side to said first outwardly extending flange and a part of said second door portion extending in continuous fashion from said second side to said second outwardly extending flange, said first outwardly extending flange being heat bonded to said second outwardly extending flange during forming of said first door portion and said second door portion.

2. The twinsheet door of claim 1, further comprising a weatherstrip circumscribing said first outwardly extending flange and said second outwardly extending flange, after said first outwardly extending flange is bonded to said second outwardly extending flange.

3. The twinsheet door of claim 1, further comprising:
   a first inner flange formed as part of said first door portion; and
   a second inner flange formed as part of said second door portion such that said first inner flange is bonded to said second inner flange forming a first aperture, allowing a window to be mounted in said first aperture, wherein said fourth side of said one or more closed sections is formed by part of said first door portion extending from said first side in continuous fashion to said first inner flange and part of said second door portion extending from said second side in continuous fashion to said second inner flange.

4. The twinsheet door of claim 1, further comprising:
a third inner flange formed as part of said first door portion; and
a fourth inner flange formed as part of said second door portion such that said third inner flange is bonded to said second inner flange, allowing a window to be mounted in a second aperture, wherein said fourth side of said one or more closed sections is formed by part of said first door portion extending from said first side in continuous fashion to said third inner flange and part of said second door portion extending from said second side in continuous fashion to said fourth inner flange.

5. The twinsheet door of claim 1, further comprising:
a large cut-out portion formed in said first door portion; and
a small cut-out portion formed in said second door portion, said large cut-out portion and said small cut-out portion forming a third aperture.

6. The twinsheet door of claim 5, further comprising:
a first rib formed on said first door portion; and
a second rib formed on said second door portion, wherein said first rib is bonded to said second rib to improve the structural rigidity of said twinsheet door.

7. The twinsheet door of claim 6, further comprising:
a plurality of hinges operable for allowing said twinsheet door to pivot between an open position and a closed position; and
a door latch mounted to said second door portion such that said door latch is partially disposed in said large cut-out portion and partially disposed in said small cut-out portion, said door latch operable for securing said twinsheet door in said closed position.

8. The twinsheet door of claim 1, further comprising:
a first wall portion formed as part of said first door portion;
a second wall portion formed as part of said second door portion; and
a rib formed as part of said first wall portion, said rib being bonded to said second wall portion to provide increased strength to said door.

9. A twinsheet door for a vehicle, comprising:
a first door portion;
a second door portion connected to said first door portion;
one or more closed sections having a first side, a second side, a third side, and a fourth side, said one or more closed sections created by portions of said first door portion being bonded to portions of said second door portion, said one or more closed sections operable for providing structure and rigidity to said twinsheet door;
a first outer flange formed on an outer edge of said first door portion;
a second outer flange formed on an outer edge of said second door portion such that said first outer flange is bonded to said second outer flange, and said third side is formed by part of said first door portion extending in continuous fashion from said first side into said first outer flange and part of said second door portion extending in continuous fashion from said second side into said second outer flange; and
a weatherstrip circumscribing said first outer flange and said second outer flange, after said first outer flange is bonded to said second outer flange.

10. The twinsheet door for a vehicle of claim 9, wherein said first side is formed by a portion of said first door portion, said second side formed by a portion of said second door portion.

11. The twinsheet door for a vehicle of claim 9, further comprising:
a first wall portion formed as part of said first door portion;
a second wall portion formed as part of said second door portion; and
a rib formed as part of said first wall portion, said rib being bonded to said second wall portion to provide increased strength to said door.

12. The twinsheet door for a vehicle of claim 9, further comprising a first aperture formed by a first inner flange formed as part of said first door portion bonded to a second inner flange formed as part of said second door portion, wherein said fourth side of said one or more closed sections is formed by part of said first door portion extending from said first side in continuous fashion to said first inner flange and part of said second door portion extending from said second side in continuous fashion to said second inner flange.

13. The twinsheet door for a vehicle of claim 9, further comprising a second aperture formed by a third inner flange of said first door portion bonded to a fourth inner flange of said second door portion, wherein said fourth side of said one or more closed sections is formed by part of said first door portion extending from said first side in continuous fashion to said third inner flange and part of said second door portion extending from said second side in continuous fashion to said fourth inner flange.

14. The twinsheet door for a vehicle of claim 9, further comprising:
a third aperture formed by a large cut-out portion of said first door portion and a small cut-out portion of said second door portion;
a first rib formed on said first door portion in proximity to said large cut-out; and
a second rib formed on said second door portion, wherein said first rib is bonded to said second rib in an area in proximity to said large cut-out, improving the structural rigidity of said twinsheet door.

15. The twinsheet door for a vehicle of claim 14, further comprising:
a plurality of hinges attached to said twinsheet door and a vehicle, said plurality of hinges operable for allowing said twinsheet door to pivot between an open position and a closed position; and
a door latch mounted to said second door portion such that said door latch is partially disposed in said large cut-out portion and partially disposed in said small cut-out portion, said door latch being operable for securing said twinsheet door in said closed position.

16. A twinsheet door for a vehicle, comprising:
a first door portion;
a second door portion connected to said first door portion;
a closed section having a first side, a second side, a third side, and a fourth side, said closed section created by portions of said first door portion melt-bonded to portions of said second door portion, said closed section operable for providing structure and rigidity to said twinsheet door;
a first aperture formed by a first inner flange formed as part of said first door portion melt-bonded to a second inner flange formed as part of said second door portion;
a second aperture formed by a third inner flange of said first door portion melt-bonded to a fourth inner flange of said second door portion; and a third aperture formed by a large cut-out portion of said first door portion and a small cut-out portion of said second door portion.

17. The twinsheet door for a vehicle of claim 16, further comprising:
a first rib formed on said first door portion in proximity to said large cut-out; and
a second rib formed on said second door portion, wherein said first rib is melt-bonded to said second rib in an area in proximity to said large cut-out, improving the structural rigidity of said twinsheet door.

18. The twinsheet door for a vehicle of claim 16, further comprising:
a plurality of hinges attached to said twinsheet door and a vehicle, said plurality of hinges operable for allowing said twinsheet door to pivot between an open position and a closed position; and
a door latch mounted to said second door portion such that said door latch is partially disposed in said large cut-out portion and partially disposed in said small cut-out portion, said door latch operable for securing said twinsheet door in said closed position.

19. The twinsheet door for a vehicle of claim 16, comprising:
a first wall portion formed as part of said first door portion;
a second wall portion formed as part of said second door portion; and
a rib formed as part of said first wall portion, said rib being melt-bonded to said second wall portion to provide increased strength to said door.

20. The twinsheet door for a vehicle of claim 16, further comprising:
a first outer flange formed on an outer edge of said first door portion;
a second outer flange formed on an outer edge of said second door portion such that said first outer flange is bonded to said second outer flange, and said third side is formed by part of said first door portion extending in continuous fashion from said first side into said first outer flange and part of said second door portion extending in continuous fashion from said second said into said second outer flange; and
a weatherstrip, said weatherstrip circumscribing said first outer flange and said second outer flange, after said first outer flange is melt-bonded to said second outer flange.

21. A twinsheet door, comprising:
a first door portion;
a second door portion connected to said first door portion;
one or more closed sections created when said first door portion is thermally bonded to said second door portion and simultaneously a vacuum is applied to form said first door portion and said second door portion, said one or more closed sections providing structure and rigidity to said twinsheet door;
a first side formed by a portion of said first door portion;
a second side formed by a portion of said second door portion, said first side and said second side being drawn away from each other when said vacuum is applied to form said first door portion and said second door portion, said first side being on the opposite side of said closed section as said second side;
a third side formed by a portion of said first door portion and a portion of said second door portion, connecting said first side and said second side;
a fourth side formed by a portion of said first door portion and a portion of said second door portion, connecting said first side and said second side, said fourth side being on the opposite side of said close section as said third side;
a large cut-out portion formed in said first door portion; and
a small cut-out portion formed in said second door portion, said large cut-out portion and said small cut-out portion forming a third aperture.

22. The twinsheet door of claim 21, further comprising:
a first outwardly extending flange formed on said first door portion; and
a second outwardly extending flange formed on said second door portion, part of said third side of said one or more closed sections being formed by a part of said first door portion extending in continuous fashion from said first side to said first outwardly extending flange and a part of said second door portion extending in continuous fashion from said second side to said second outwardly extending flange, said first outwardly extending flange being heat bonded to said second outwardly extending flange during forming of said first door portion and said second door portion.

23. The twinsheet door of claim 22, further comprising a weatherstrip circumscribing said first outwardly extending flange and said second outwardly extending flange, after said first outwardly extending flange is bonded to said second outwardly extending flange.

24. The twinsheet door of claim 21, further comprising:
a first inner flange formed as part of said first door portion; and
a second inner flange formed as part of said second door portion such that said first inner flange is bonded to said second inner flange forming a first aperture, allowing a window to be mounted in said first aperture, wherein said fourth side of said one or more closed sections is formed by part of said first door portion extending from said first side in continuous fashion to said first inner flange and part of said second door portion extending from said second side in continuous fashion to said second inner flange.

25. The twinsheet door of claim 21, further comprising:
a third inner flange formed as part of said first door portion; and
a fourth inner flange formed as part of said second door portion such that said third inner flange is bonded to said second inner flange, allowing a window to be mounted in a second aperture, wherein said fourth side of said one or more closed sections is formed by part of said first door portion extending from said first side in continuous fashion to said third inner flange and part of said second door portion extending from said second side in continuous fashion to said fourth inner flange.

26. The twinsheet door of claim 21, further comprising
a first rib formed on said first door portion; and
a second rib formed on said second door portion, wherein said first rib is bonded to said second rib to improve the structural rigidity of said twinsheet door.

27. The twinsheet door of claim 26, further comprising:
a plurality of hinges operable for allowing said twinsheet door to pivot between an open position and a closed position; and
a door latch mounted to said second door portion such that said door latch is partially disposed in said large cut-out portion and partially disposed in said small cut-out portion, said door latch operable for securing said twinsheet door in said closed position.

28. The twinsheet door of claim 21, further comprising:
a first wall portion formed as part of said first door portion;
a second wall portion formed as part of said second door portion; and
a rib formed as part of said first wall portion, said rib being bonded to said second wall portion to provide increased strength to said door.

29. A twinsheet door for a vehicle, comprising:
a first door portion;
a second door portion connected to said first door portion;
one or more closed sections having a first side, a second side, a third side, and a fourth side, said one or more closed sections created by portions of said first door portion being bonded to portions of said second door portion, said one or more closed sections operable for providing structure and rigidity to said twinsheet door;
a third aperture formed by a large cut-out portion of said first door portion and a small cut-out portion of said second door portion;
a first rib formed on said first door portion in proximity to said large cut-out; and
a second rib formed on said second door portion, wherein said first rib is bonded to said second rib in an area in proximity to said large cut-out, improving the structural rigidity of said twinsheet door.

30. The twinsheet door for a vehicle of claim 29, wherein said first side is formed by a portion of said first door portion, said second side formed by a portion of said second door portion.

31. The twinsheet door for a vehicle of claim 29, further comprising:
a first outer flange formed on an outer edge of said first door portion;
a second outer flange formed on an outer edge of said second door portion such that said first outer flange is bonded to said second outer flange, and said third side is formed by part of said first door portion extending in continuous fashion from said first side into said first outer flange and part of said second door portion extending in continuous fashion from said second side into said second outer flange; and
a weatherstrip circumscribing said first outer flange and said second outer flange, after said first outer flange is bonded to said second outer flange.

32. The twinsheet door for a vehicle of claim 29, further comprising:
a first wall portion formed as part of said first door portion;
a second wall portion formed as part of said second door portion; and
a rib formed as part of said first wall portion, said rib being bonded to said second wall portion to provide increased strength to said door.

33. The twinsheet door for a vehicle of claim 29, further comprising a first aperture formed by a first inner flange formed as part of said first door portion bonded to a second inner flange formed as part of said second door portion, wherein said fourth side of said one or more closed sections is formed by part of said first door portion extending from said first side in continuous fashion to said first inner flange and part of said second door portion extending from said second side in continuous fashion to said second inner flange.

34. The twinsheet door for a vehicle of claim 29, further comprising a second aperture formed by a third inner flange of said first door portion bonded to a fourth inner flange of said second door portion, wherein said fourth side of said one or more closed sections is formed by part of said first door portion extending from said first side in continuous fashion to said third inner flange and part of said second door portion extending from said second side in continuous fashion to said fourth inner flange.

35. The twinsheet door for a vehicle of claim 29, further comprising:
a plurality of hinges attached to said twinsheet door and a vehicle, said plurality of hinges operable for allowing said twinsheet door to pivot between an open position and a closed position; and
a door latch mounted to said second door portion such that said door latch is partially disposed in said large cut-out portion and partially disposed in said small cut-out portion, said door latch being operable for securing said twinsheet door in said closed position.

* * * * *